(12) United States Patent
Wang et al.

(10) Patent No.: US 9,317,448 B2
(45) Date of Patent: Apr. 19, 2016

(54) METHODS AND APPARATUS RELATED TO DATA PROCESSORS AND CACHES INCORPORATED IN DATA PROCESSORS

(71) Applicant: Advanced Micro Devices, Inc., Sunnyvale, CA (US)

(72) Inventors: Zhe Wang, San Antonio, TX (US); Xie Yuan, State College, PA (US); Junli Gu, Beijing (CN); Yi Xu, Beijing (CN); ShuChang Shan, Beijing (CN); Shuai Mu, Beijing (CN); Ting Cao, Beijing (CN)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 283 days.

(21) Appl. No.: 13/953,835

(22) Filed: Jul. 30, 2013

(65) Prior Publication Data
US 2015/0039836 A1 Feb. 5, 2015

(51) Int. Cl.
*G06F 12/00* (2006.01)
*G06F 12/12* (2006.01)
*G06F 12/08* (2006.01)

(52) U.S. Cl.
CPC .......... *G06F 12/123* (2013.01); *G06F 12/0804* (2013.01); *G06F 12/12* (2013.01); *G06F 12/121* (2013.01); *G06F 2212/1024* (2013.01)

(58) Field of Classification Search
CPC ................ G06F 12/0804; G06F 12/12; G06F 12/121–12/128
See application file for complete search history.

(56) References Cited

U.S. PATENT DOCUMENTS

| | | | |
|---|---|---|---|
| 5,067,078 A | 11/1991 | Talgam et al. | |
| 8,180,964 B1 * | 5/2012 | Koh et al. | 711/118 |
| 2005/0138289 A1 * | 6/2005 | Royer, Jr. | G06F 12/0866 711/118 |

OTHER PUBLICATIONS

Samira M. Khan, Zhe Wang and Daniel A. Jimenez, "Decoupled Dynamic Cache Segmentation," 12 pages, Proceedings of the 18th International Symposium on High Performance Computer Architecture (HPCA-18), Feb. 2012.

Moinuddin K. Qureshi, Michele M. Franceschini, Ashish Jagmohan and Luis A. Lastras, "PreSET: Improving Performance of Phase Change Memories by Exploiting Asymmetry in Write Times," 12 pages, 2012, 978-1-4673-0476-4/12/$31.00(c)2012 IEEE.

Vivek Seshadri, Onur Mutlu, Michael A. Kozuch and Todd C. Mowry, "The Evicted-Address Filter: A Unified Mechanism to Address Both Cache Pollution and Thrashing," 12 pages, PACT' 12, Sep. 19-23, 2012, Minneapolis, MN, ACM 978-1-4503-1182-3/12/09.

* cited by examiner

*Primary Examiner* — Shawn X Gu
(74) *Attorney, Agent, or Firm* — Paul J. Polansky; Polansky & Associates, P.L.L.C.

(57) ABSTRACT

A cache includes a cache array and a cache controller. The cache array has a multiple number of entries. The cache controller is coupled to the cache array, for storing new entries in the cache array in response to accesses by a data processor, and evicts entries from the cache array according to a cache replacement policy. The cache controller includes a frequent writes predictor for storing frequency information indicating a write back frequency for the multiple number of entries. The cache controller selects a candidate entry for eviction based on both recency information and the frequency information.

20 Claims, 4 Drawing Sheets

METHODS AND APPARATUS RELATED TO DATA PROCESSORS AND CACHES INCORPORATED IN DATA PROCESSORS

FIELD

This disclosure relates generally to data processors, and more specifically to caches for data processors.

BACKGROUND

Consumers continue to desire computer systems with higher performance and lower cost. To address higher performance requirements, computer chip designers have developed data processors having multiple processor cores along with a cache memory hierarchy on a single microprocessor chip. The caches in the cache hierarchy increase overall performance by reducing the average time required to access frequently used instructions and data. First level (L1) caches in the cache hierarchy are generally placed operationally close to a corresponding processor core. Typically, a processor core accesses its own dedicated L1 cache, while a last level cache (LLC) may be shared between more than one processor core and operates as the last cache between the processor cores and off-chip memory. The off-chip memory generally includes commercially available dynamic random access memory (DRAM) chips such as double data rate (DDR) synchronous DRAMs (SDRAMs), but may also include phase change memory (PCM).

PCM is an emerging form of non-volatile memory that provides certain advantages over other known types of memory. For example, PCM can be implemented with multiple bits in a single cell, and the data processor can take advantage of long-term persistent storage. Also, in contrast to DRAM, PCM does not require refresh operations since it is a non-volatile memory technology. More particularly, PCM technology is based on phase change material that has an amorphous phase having a high resistance, typically in megohms, and a crystalline phase having a low resistance, typically in kilohms. When the memory controller writes a logic zero to a memory cell, the PCM memory applies a large current to the associated cells for a short duration, in order to heat the PCM material and transform it to the amorphous phase. When the memory controller writes a logic one to a memory cell, the PCM memory applies a relatively smaller current to slowly heat the associated cells. However, the smaller current is applied to the cell for a longer duration to transform the PCM material to the crystalline phase. Thus, when the memory controller performs write back operations, the PCM consumes significant power based on the corresponding high programming voltage and current. The data processor also consumes more power and takes a longer time to complete write operations using PCM as the off-chip memory.

The cache controllers store new entries in their corresponding cache arrays in response to accesses by the processor cores. If a processor core has modified data stored in a cache line, the cache controller determines when to write the "dirty" cache line back to the off-chip memory according to its write back policy. For example, the cache controller may follow a write back on eviction policy. However, slow write back operations could degrade the overall performance of the microprocessor by causing the memory controller to inefficiently perform the write backs and possibly stalling the processor core, especially for example, when using PCM memory as the off-chip memory.

Figure 1:
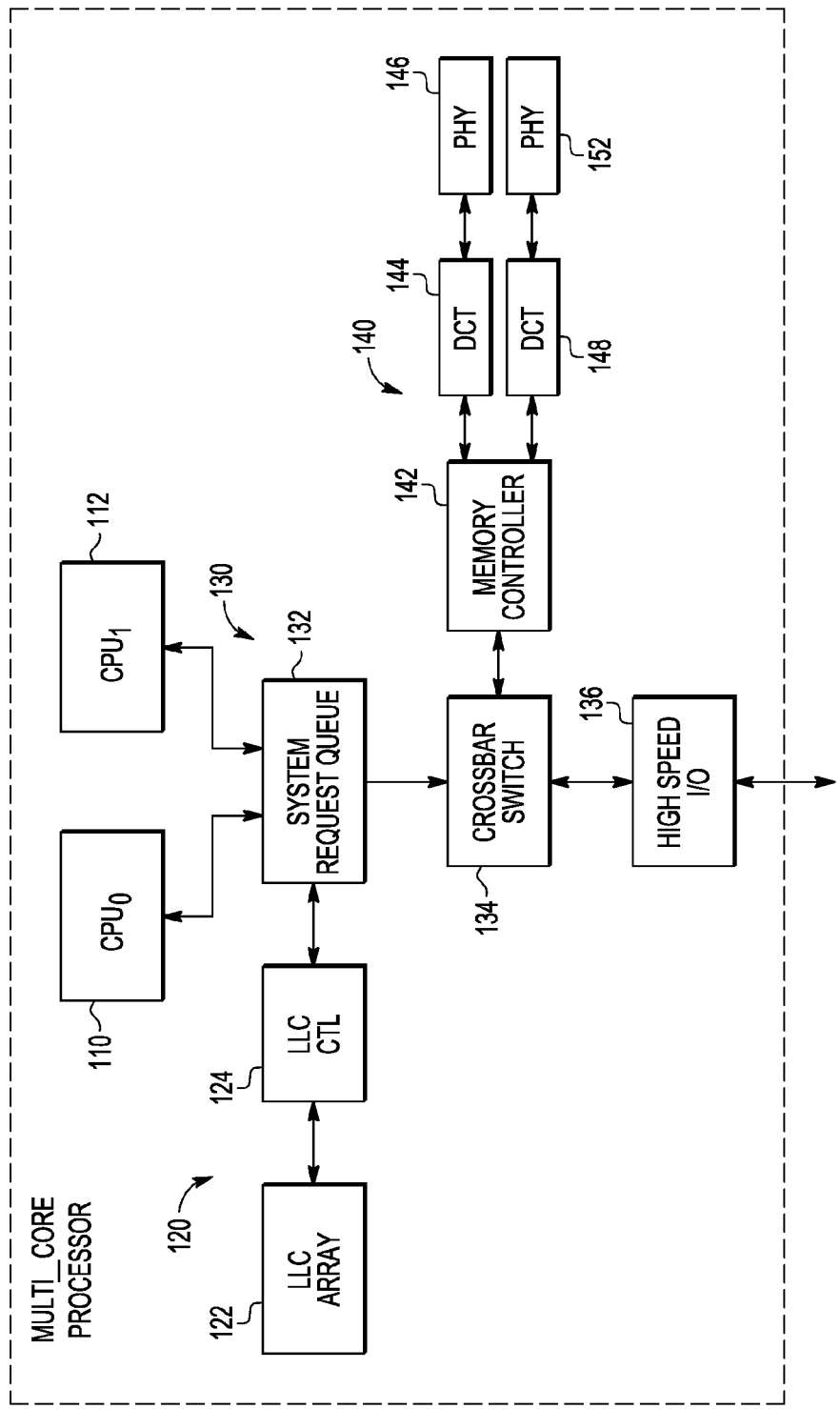
FIG. 1 illustrates in block diagram form a multi-core data processor with an LLC according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In one form a cache (such as, for example, an LLC) includes a cache array and a cache controller. The cache array has a multiple number of entries. The cache controller is connected to the cache array, stores new entries in the cache array in response to accesses by a data processor, and evicts entries from the cache array according to a cache replacement policy. A cache as described herein includes a cache controller that selects a victim for eviction based not only on its recency of use, but also based on how frequently the cache line is written back to main memory. By considering both recency and frequency information, the memory controller is able to reduce overall memory bus usage, especially when used with memory that performs slow write operations such as PCM.

The cache controller also includes a frequent writes predictor (FWP). In some embodiments, the cache controller adaptively partitions the cache lines of a cache array into a frequent write back cache lines partition and a non-frequent write back cache lines partition, and sizes each partition based on frequency information stored by the FWP. If the FWP predicts a size for the frequent write back cache lines partition that is larger than the current size of the frequent write back cache lines partition, the cache controller chooses a candidate for eviction from the frequent write back cache lines partition. Otherwise, the cache controller chooses a candidate for eviction from the non-frequent write back cache lines partition.

FIG. 1 illustrates in block diagram form a multi-core data processor 100 with an LLC 120 according to some embodiments. For the example shown in FIG. 1, data processor 100 generally includes a central processing unit (CPU) core 110 labeled "$CPU_0$," and a CPU core 112 labeled "$CPU_1$", an LLC 120, a traffic hub 130, a high speed input/output (I/O) 136, and a memory interface 140.

LLC 120 includes a cache array 122, and a last level cache controller (CTL) 124. Cache controller 124 is connected to cache array 122. In FIG. 1, LLC 120 is a shared second level cache (L2). In some embodiments, LLC 120 could be at a different level of the cache hierarchy, and may not be at the last level.

Traffic hub 130 includes a system request queue 132 and a crossbar switch 134. System request queue 132 is connected to each of CPU cores 110 and 112, is connected to cache controller 124, and has an output. Crossbar switch 134 has an input connected to the output of system request queue 132.

High speed I/O 136 is connected to crossbar switch 134, and is connected to a set of high speed peripherals (not shown).

Memory interface 140 provides two DRAM channels, and includes a memory controller 142, a DRAM controller (DCT) 144, a physical layer interface (PHY) 146, a DCT 148, and a PHY 152. Memory controller 142 is connected to crossbar switch 134. DCT 144 is connected to memory controller 142 for a first memory channel. PHY 146 is connected to DCT 144 for the first memory channel. DCT 148 is connected to memory controller 142 for a second memory channel. PHY 152 is connected to DCT 148 for the second memory channel.

Cache controller 124 identifies dirty data and also determines when to write back the dirty data to main memory. Cache controller 124 is responsible for storing recently accessed data and evicting data according to a cache replacement policy. However, in addition, cache controller 124 selects a victim for eviction based not only on its recency of use (using, for example, an LRU algorithm), but can also consider frequency of write back when making eviction decisions. As used herein, a cache line in general, is any form of data that is transferred between main memory and cache array 220 in blocks of fixed size. Thus, cache controller 124 is also capable of selecting cache lines for eviction that, for example, CPU cores 110 and 112 accessed more recently than other cache lines.

In operation, each of CPU cores 110 and 112 provide memory access requests to system request queue 132. CPU cores 110 and 112 each include an L1 cache (not shown), and access their corresponding L1 cache to determine whether the requested cache line has been allocated to the cache before accessing the next lower level of the cache hierarchy.

When CPU cores 110 and 112 perform a read or write access, the corresponding CPU core checks the L1 cache first to see whether the L1 cache has allocated a cache line corresponding to the access address. If the cache line is present in the L1 cache (i.e. the access "hits" in the L1 cache), the corresponding CPU core completes the access with the L1 cache. If the access misses in the L1 cache, the L1 cache checks the next lower levels of the cache hierarchy. CPU cores 110 and 112 share LLC 120, which provides the memory for a last level of cache within the cache hierarchy. Cache controller 124 stores new entries in cache array 122 in response to accesses by CPU cores 110 and 112. If the address of the request does not match any cache entries, LLC 120 will indicate a cache miss. In response, cache controller 124 identifies an entry for eviction from LLC 120 using a cache replacement policy, to make room for the data that missed in LLC 120.

LLC 120, traffic hub 130, and memory interface 140 typically form a controller known as a Northbridge (NB). System request queue 132 synchronizes and stores accesses for dispatch to memory interface 140 or high speed I/O 136. Traffic hub 130 routes transactions to LLC 120, for example, requests from CPU cores 110 and 112, or a request from a high speed bus agent (not shown) to data processor 100 via high speed I/O 136. MCT 142 is adapted to access memory locations in the address space of memory, in response to memory access requests, and in particular, memory controller 142 sends DRAM read and write requests to DCTs 144 and 148. PHYs 146 and 152 each provide an interface for DCTs 144 and 148, respectively, to corresponding DRAM memory locations (not shown), as indicated according to DRAM compatible standards.

By selecting a victim for eviction based not only on its recency of use, but also based on how frequently the cache line is written back to main memory, cache controller 124 can reduce the overall use of the off-chip memory bus. This advantage will be even more significant when PCM is used as the off-chip memory.

Figure 2:
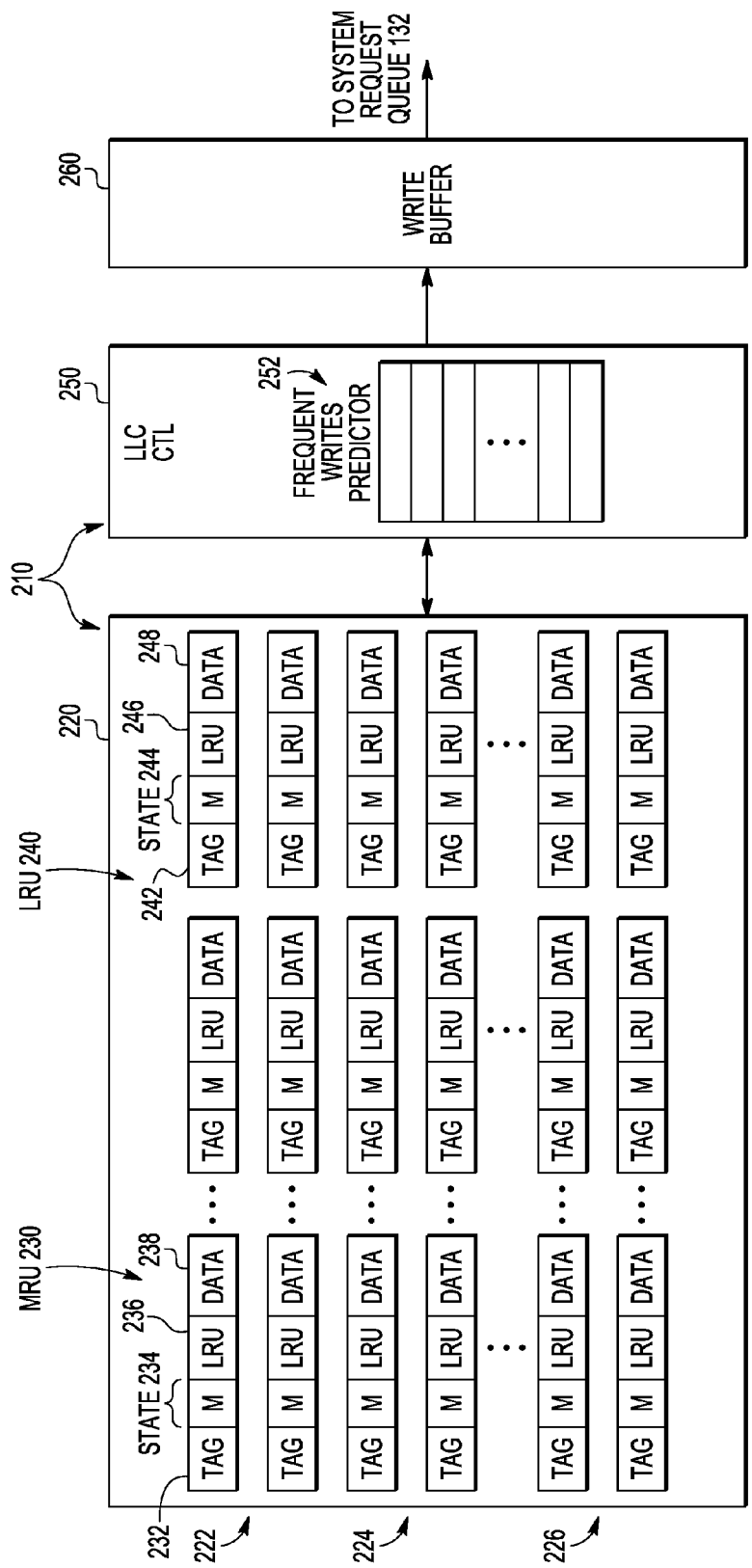
FIG. 2 illustrates in block diagram form a portion of an LLC that may be used to implement the LLC of FIG. 1 and an associated write buffer according to some embodiments.

FIG. 2 illustrates in block diagram form a portion 200 of an LLC 210 that may be used to implement LLC 120 of FIG. 1 and an associated write buffer 260 according to some embodiments. The example in FIG. 2 shows a logical association of LLC 210 that generally includes a cache array 220, and a cache controller 250.

Cache array 220 includes cache lines organized in regions of sets. Cache array 220 shows representative entries that include most recently used (MRU) entries 230, and LRU entries 240. Each of MRU entries 230 stores a tag 232, a field of state bits 234 corresponding to tag 232 including a modified bit (M), a field of LRU bits 236, and a field of data bits 238. Each of LRU entries 240 stores a tag 242, a field of state bits 244 corresponding to tag 242 including an M bit, a field of LRU bits 246, and a field of data bits 248.

Cache controller 250 includes an FWP 252, which is a table that stores information to indicate the frequency of write back for a multiple number of table entries. Cache controller 250 is connected to cache array 220, and has an output. Write buffer 260 has an input connected to the output of cache controller 250, and an output to provide write requests to system request queue 132.

In operation, each cache line of cache array 220 includes tag fields, for example tags 232 and 242, to associate an entry with a physical address. According to certain coherency protocols, each cache line includes state bits, for example state bits 234 and 244 to indicate a particular state the cache line is in. For example, for the "MOESI" cache coherency protocol, state bits 234 and 244 indicate whether a cache line is modified (M), owned (O), exclusive (E), shared (S), or invalid (I).

Cache controller 124 accesses the LRU field to determine least recently used cache lines, and actually evicts cache lines that are least recently used when it makes room in cache array 220 for a new cache line. LRU entries 240 are candidates for eviction from cache array 220, and write back to main memory.

As discussed further below, cache controller 210 uses FWP 252 to determine cache lines to keep in cache array 220 based on how frequently the cache lines are written back to main memory. Moreover as will be explained further below, cache controller 210 adaptively partitions the full set of cache lines into a frequent write back cache lines partition and a non-frequent write back cache lines partition, and right sizes each partition, based on frequency information stored by FWP 252.

Figure 3:
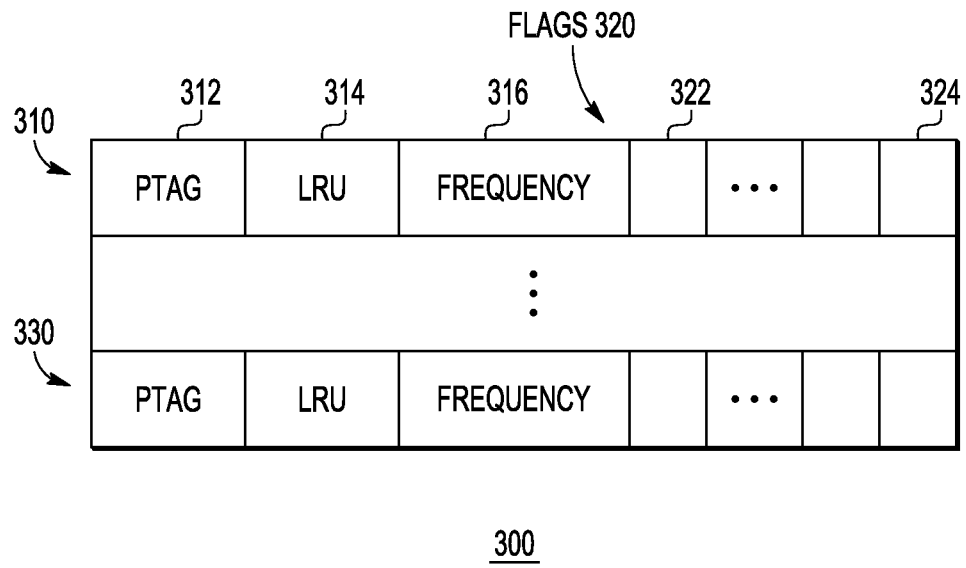
FIG. 3 illustrates a representation of the frequent writes predictor (FWP) of FIG. 2 according to some embodiments.

FIG. 3 illustrates a representation of a table 300 that could be used for FWP 252 of FIG. 2 according to some embodiments. Table 300 includes a set of entries, such as a representative first entry 310 and a representative last entry 330. Each entry of table 300 includes a partial tag (PTAG) field 312, LRU bits 314, a frequency field 316 that stores a count value, and a flags field 320. Flags field 320 includes a set of flags, including a representative first flag 322, and a representative last flag 324.

Table 300 is organized as an associative memory, where each address in cache array 220 is mapped to a certain location of table 300. Partial tag field 312 stores a most significant portion of the addresses stored in the tag fields of cache array 220. LRU bits 314 store recency information for the cache lines stored in cache array 220. Frequency field 316 stores frequency information to indicate how often cache controller 250 selects cache lines in the group indicated by partial tag 312 for write back to main memory. Each flag of flags field 320 stores information corresponding to a write back frequency for particular cache lines of cache array 220 that share the same index and partial tag, and map to the selected locations of FWP 252.

Thus, FWP 252 not only stores coarse write back frequency information for a group of cache lines indicated by a partial tag, but also stores fine write back frequency information for each cache line within the group. In the embodiment shown in FIG. 3, the flag indicates whether the cache line is in a frequent partition or a non-frequent partition. Cache controller 210 advantageously uses the write back frequency information of both cache sets and cache lines for fine tuning the accuracy of choosing write back candidates.

In operation, for each of entries 310 through 330, a flag bit storing a logic high indicates cache controller 250 frequently selects the corresponding cache line for writing back to main memory, and a flag bit storing a logic low indicates cache controller 250 infrequently selects the corresponding cache line for writing back to main memory. When cache controller 250 searches cache array 220 for tag 232, cache controller 250 concurrently searches FWP 252 for a corresponding partial tag field 312. In some embodiments, partial tag field 312 includes 16 bits of each of the tag fields of cache array 220. Since cache controller 250 makes predictions based on both sets of cache lines and on individual cache lines, it conserves area and power by matching partial tags within FWP 252, instead of complete tags.

As part of the updating process, each corresponding bit of frequency field 316 is initialized, for example, to a logic low. Subsequently, for each match of a partial tag field, cache controller 250 updates the corresponding frequency bit and the bits of flags field 320.

In some embodiments, cache controller 250 chooses a victim for eviction from cache array 220 based on a weight of the frequency information relative to the recency information. For example, cache controller 250 uses an algorithm that applies a multiplier to the recency information for assigning a weight to the recency information relative to the frequency information. In particular, cache controller 210 determines a computation interval for computing the frequency of write back information based on the multiplier.

Cache controller 210 uses flags field 320 to adaptively partition the full set of cache lines into a frequent write back cache lines partition and a non-frequent write back cache lines partition. Cache controller 210 performs an optimal segment prediction to adapt the size of each partition based on frequency field 316. If cache controller 210 predicts a size for the frequent write back cache lines partition that is larger than the current size of the frequent write back cache lines partition, the cache controller chooses a candidate for eviction from the frequent write back cache lines partition. Otherwise, the cache controller chooses a candidate for eviction from the non-frequent write back cache lines partition.

Figure 4:
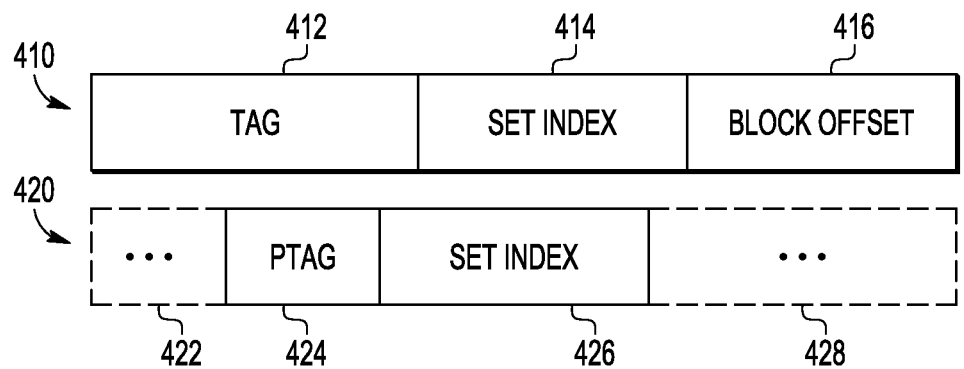
FIG. 4 illustrates a mapping of an input address to entries in the cache of FIG. 1 and the FWP of FIG. 2 according to some embodiments.

FIG. 4 illustrates a mapping 400 of an input address to entries in cache 120 and FWP 252 according to some embodiments. The input address could be the address of a write miss which requires an update of the count field in FWP 252, or the address of a victim line that must be evicted from cache 200 based on both recency and frequency information. In FIG. 4, a first mapping 410 indicates how cache controller 120 uses the input address to locate data in cache array 122 and includes a tag field 412, a set index field 414, and a block offset field 416. Cache 120 is a set associative cache, and it uses set index field 414 of the input address to find a set of possible locations in cache array 220 for a matching cache line. For example if cache array 122 stores sixteen different cache lines for each set, it would be known as a 16-way set associative cache. Cache controller 124 uses set index field 414 to locate the set in cache array 122. It then performs an associative lookup for all entries in cache array 122 corresponding to set index 414 to see if TAG field 412 matches the tag of one of the entries in the set. If there is a match between tag field 412 and a tag of a cache line in that set, then the access has hit in cache 120. If there is no match with any of the cache lines in the set, then the access has missed in cache 120. In the case of a cache miss, assuming cache 120 is full, cache controller 250 searches for a cache line to evict based on both frequency information and recency information, as discussed above.

A second mapping 420 indicates how an address maps to lines in FWP 252 and includes a reserved field 422, a partial tag field 424 labeled "PTAG", a set index field 426, and a reserved field 428. To access FWP 252, cache controller 250 uses set index field 426 to access a corresponding set in FWP 252, and then uses partial tag field 424 to find an entry in the set. Assuming no error, an access that has hit in cache array 220 will also hit in FWP 252. In general, cache 120 maps each m entries in cache array 220 to n entries in FWP 252.

For example, assume m=16 and n=4. Reserved field 428 will extend to $\log_2(m)=4$ more significant bits of the input address beyond the most significant bit of block offset field 416. Moreover, set index field 426 will extend to $\log_2(n)=2$ more significant bits of the input address beyond the most significant bit of set index field 414.

By mapping m cache sets to n sets in FWP 252, cache 120 allows efficient lookup of frequency data using the coarse-fine mapping described above.

Figure 5:
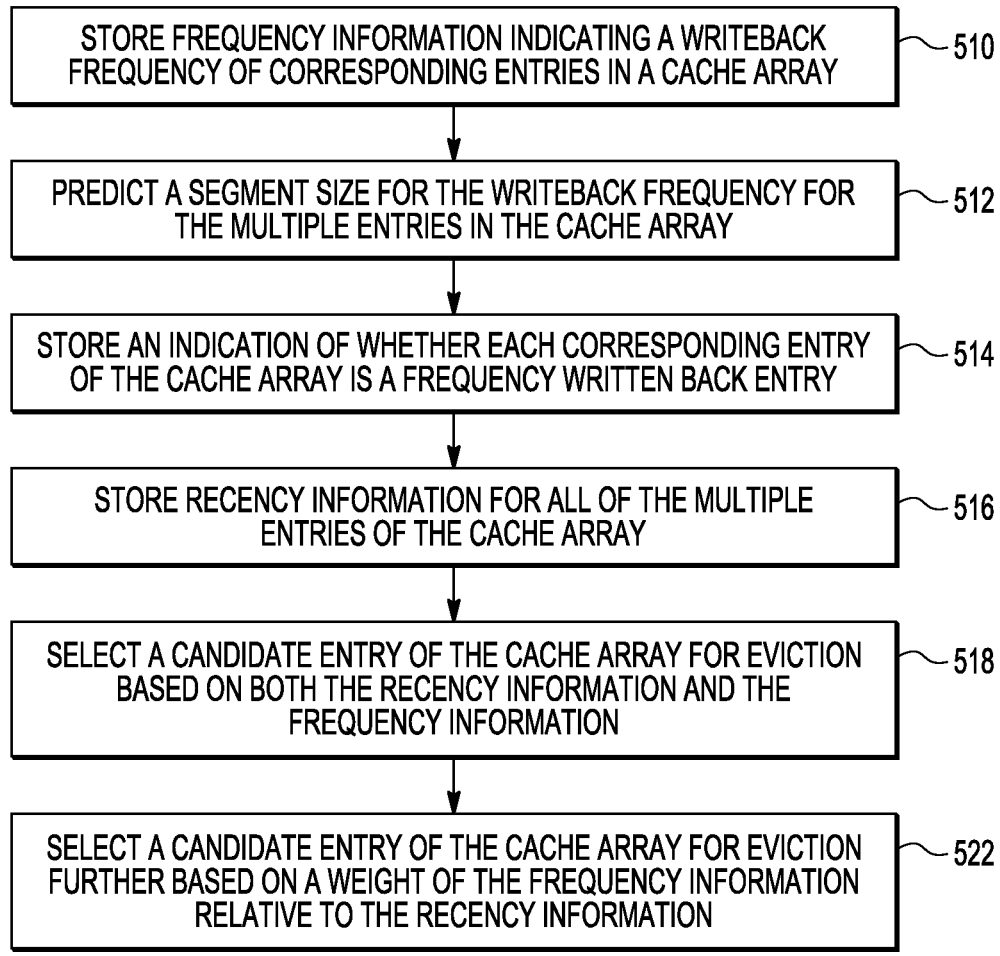
FIG. 5 illustrates a flow diagram of a method for selecting a candidate entry of a cache array for eviction according to some embodiments.

FIG. 5 illustrates a flow diagram of a method 500 for selecting a candidate entry of cache array 220 for eviction according to some embodiments. For the example shown in FIG. 5, action box 510 includes storing frequency information indicating a write back frequency of corresponding entries in a cache array. Action box 512 includes predicting a segment size for the write back frequency for the multiple entries in the cache array. Action box 514 includes storing an indication of whether each corresponding entry of the cache array is a frequently written back entry. Action box 516 includes storing recency information for all of the multiple entries of the cache array. Action box 518 includes selecting a candidate entry of the cache array for eviction based on both the recency information and the frequency information. Action box 522 includes selecting the candidate entry of the cache array for eviction further based on a weight of the frequency information relative to the recency information. In some embodiments, method 500 is further characterized as storing an indication of whether each corresponding entry of the cache array is a frequently written back cache line.

Thus, a cache as described herein includes a cache controller that selects a victim for eviction based not only on its recency of use, but can also consider frequency of write back when making eviction decisions. The cache controller can also consider frequency of write back when making eviction decisions. The cache controller as described herein further includes a FWP that adaptively partitions the full set of cache lines of the cache array into a frequent write back cache lines partition and a non-frequent write back cache lines partition. The cache controller further right sizes each partition based on the FWP. If the FWP predicts a size for the frequent write back cache lines partition that is larger than the current size of the frequent write back cache lines partition, the cache controller chooses a candidate for eviction from the frequent write back cache lines partition. Otherwise, the cache controller chooses a candidate for eviction from the non-frequent write back cache lines partition. The memory controller is able to take advantage of both recency and frequency information to reduce the overall overhead of memory write operations.

The functions of data processor 100 of FIG. 1, portion 200 and FWP 252 of FIG. 2, representation 300 of FIG. 3, and address mapping 400 of FIG. 4, may be implemented with various combinations of hardware and software. For example, some functions of portion 200, FWP 252, representation 300, and address mapping 400, may be determined by an operating system, firmware, or software drivers, and stored as a table in non-volatile memory. For the example shown in FIG. 2, cache controller 210 uses FWP 252 for storing frequency information indicating a write back frequency for multiple entries of cache array 220, where cache controller 250 selects a candidate entry for eviction based on both recency information and the frequency information. In some embodiments, other hardware, software, or combined hardware and software implementations could be used. Some of the software components may be stored in a computer readable storage medium for execution by at least one processor. Moreover the method illustrated in FIG. 5 may also be governed by instructions that are stored in a computer readable storage medium and that are executed by at least one processor. Each of the operations shown in FIG. 5 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the circuits of FIG. 1, FIG. 2, and FIG. 3 may be described or represented by a computer accessible data structure in the form of a database or other data structure which can be read by a program and used, directly or indirectly, to fabricate integrated circuits with the circuits of FIG. 1, FIG. 2, and FIG. 3. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits with the circuits of FIG. 1, FIG. 2, and FIG. 3. The netlist may then be placed and routed to produce a data set describing geometric shapes to be applied to masks. The masks may then be used in various semiconductor fabrication steps to produce integrated circuits of, for example, FIG. 1, and FIG. 2. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, in FIG. 2, cache array 220 of LLC 210 is logically described as operating with the MOESI cache coherency protocol, and as having entries storing a tag, a set of state bits corresponding to the tag including an M bit, a set of LRU bits, and a set of DATA bits. In some embodiments, LLC 210 could be physically implemented, for example, with a tags array and a separate data array. In some embodiments, the state bits could be different bits, and LLC 210 could operate with a different cache coherency protocol.

Also, in the illustrated embodiments, data processor 100 includes two CPU cores 110 and 112. In some embodiments, data processor 100 could include a different number of CPU cores. CPU cores 110 and 112 could be other types of data processor cores than CPU cores, such as graphics processing unit (GPU) cores, digital signal processor (DSP) cores, video processing cores, multi-media cores, display engines, rendering engines, and the like. Any combination of circuits of data processor 100 and portion 200 of FIG. 1, FIG. 2, and FIG. 3, respectively, for example, CPU cores 110 and 112, LLC 120, traffic hub 130, memory interface 140, cache array 220, and FWP 252, could each use a common circuit design or different circuit designs. Also, any combination of circuits of data processor 100, and portion 200, of FIG. 1, FIG. 2, and FIG. 3, respectively, could be formed on a single integrated circuit or could be formed on multiple integrated circuits.

Accordingly, it is intended by the appended claims to cover all modifications of the disclosed embodiments that fall within the scope of the disclosed embodiments.

What is claimed is:

1. A cache comprising:
a cache array having a plurality of entries; and
a cache controller coupled to said cache array, for storing new entries in said cache array in response to accesses by a data processor, and evicting entries from said cache array according to a cache replacement policy, said cache controller comprising a frequent writes predictor for storing frequency information indicating a writeback frequency for said plurality of entries, wherein said cache controller selects a candidate entry for eviction based on both recency information and said frequency information.

2. The cache of claim 1, wherein each of said plurality of entries of said cache array comprises:
a tag;
a plurality of state bits corresponding to said entry; and
a plurality of least recently used (LRU) bits for storing recency information for said entry.

3. The cache of claim 1, wherein said frequent writes predictor table comprises an associative memory having a plurality of entries, each entry of said plurality of entries of said associative memory corresponding to a group of entries of said cache array.

4. The cache of claim 3, wherein said associative memory has a first predetermined number of sets, each corresponding to a second predetermined number of entries of said cache array.

5. The cache of claim 4, wherein each of said entries of said associative memory corresponds to a cache line of said cache array.

6. The cache of claim 3, wherein each entry of said frequent writes predictor table comprises:
a frequency field, for indicating how often data in said cache array corresponding to said entry is written back to memory; and
a flags field for indicating whether each corresponding entry of said cache array is a frequently written back entry.

7. The cache of claim 6, wherein said flags field further indicates whether each corresponding entry of said cache array is a frequently written back cache line.

8. The cache of claim 6, wherein each entry of said frequent writes predictor table further comprises:
a partial tag field for identifying said plurality of entries of said cache array to which said entry of said frequent writes predictor table corresponds; and a plurality of LRU bits for storing recency information for all of said plurality of entries of said cache array.

9. The cache of claim 1, wherein said cache controller selects said candidate entry for eviction further based on a weight of said frequency information relative to said recency information.

10. The cache of claim 1, having an output adapted to be coupled to an input of a write buffer coupled between the cache and a memory controller.

11. A cache comprising:
a cache array having a plurality of entries;
a frequent writes predictor table, coupled to said cache array, for storing frequency information indicating a write back frequency for said plurality of entries; and
a cache controller coupled to said cache array and to said frequent writes predictor table, for evicting entries from said cache array based on said frequency information.

12. The cache of claim 11, wherein each entry of said frequent writes predictor table further comprises:
a partial tag field for identifying said plurality of entries of said cache array to which said entry of said frequent writes predictor table corresponds;
a plurality of LRU bits for storing recency information for all of said plurality of entries of said cache array;
a frequency field for indicating how often data in said cache array corresponding to said entry is written back to memory; and
a flags field for indicating whether each corresponding entry of said cache array is a frequently written back entry.

13. The cache of claim 12, wherein said cache selects a candidate entry of said cache array for eviction based on both said recency information and said frequency information.

14. The cache of claim 13, wherein said cache selects said candidate entry for eviction further based on a weight of said frequency information relative to said recency information.

15. The cache of claim 11, wherein said frequent writes predictor table comprises an associative memory having a plurality of entries, each entry of said plurality of entries of said associative memory corresponding to multiple ones of said plurality of entries of said cache array.

16. The cache of claim 15, wherein said associative memory has a first predetermined number of sets, each corresponding to a second predetermined number of entries of said cache array.

17. A method of selecting a candidate entry of a cache array having a plurality of entries for eviction comprising:
storing frequency information indicating a write back frequency of corresponding entries in the cache array;
storing recency information for all of said plurality of entries of said cache array; and
selecting the candidate entry of said cache array for eviction based on both said recency information and said frequency information.

18. The method of claim 17, further comprising:
predicting a segment size for said write back frequency for said plurality of entries in said cache array.

19. The method of claim 17 further characterized as:
storing an indication of whether each corresponding entry of said cache array is a frequently written back entry.

20. The method of claim 17, further comprising:
selecting said candidate entry of said cache array for eviction further based on a weight of said frequency information relative to said recency information.

* * * * *